US012703412B2

(12) United States Patent
Imbert et al.

(10) Patent No.: US 12,703,412 B2
(45) Date of Patent: Aug. 11, 2026

(54) BRAKING SYSTEM FOR AT LEAST ONE RAILWAY VEHICLE AND RAILWAY SIGNALING ARCHITECTURE

(71) Applicant: FAIVELEY TRANSPORT ITALIA S.P.A., Piossasco (IT)

(72) Inventors: Luc Imbert, Turin (IT); Matteo Frea, Cantalupa (IT)

(73) Assignee: FAIVELEY TRANSPORT ITALIA S.P.A., Piossasco (IT)

( * ) Notice: Subject to any disclaimer, the term of this patent is extended or adjusted under 35 U.S.C. 154(b) by 757 days.

(21) Appl. No.: 18/041,978

(22) PCT Filed: Aug. 31, 2021

(86) PCT No.: PCT/IB2021/057936
§ 371 (c)(1),
(2) Date: Feb. 16, 2023

(87) PCT Pub. No.: WO2022/043964
PCT Pub. Date: Mar. 3, 2022

(65) Prior Publication Data

US 2024/0262401 A1 Aug. 8, 2024

(30) Foreign Application Priority Data

Aug. 31, 2020 (IT) ........................ 102020000020677

(51) Int. Cl.
*B61L 27/70* (2022.01)
*B60T 17/22* (2006.01)
*B61L 15/00* (2006.01)

(52) U.S. Cl.
CPC ............ *B61L 27/70* (2022.01); *B60T 17/228* (2013.01); *B61L 15/0072* (2013.01)

(58) Field of Classification Search
CPC .......... B61L 27/70; B61L 27/20; B61L 27/40; B61L 15/0072; B61L 15/0062;
(Continued)

(56) References Cited

U.S. PATENT DOCUMENTS

2016/0075354 A1 3/2016 Jung et al.
2020/0070790 A1* 3/2020 Staats ........................ B60T 8/58

FOREIGN PATENT DOCUMENTS

KR 101456534 B1 10/2014
KR 101945971 B1 5/2019
(Continued)

OTHER PUBLICATIONS

ISA European Patent Office, International Search Report Issued in Application No. PCT/IB2021/057936, Dec. 9, 2021, WIPO, 3 pages.

*Primary Examiner* — S. Joseph Morano
*Assistant Examiner* — Heaven R Buffington
(74) *Attorney, Agent, or Firm* — K&L Gates LLP

(57) ABSTRACT

A braking system for at least one railway vehicle is described, which is arranged to provide to either the at least one trackside signaling system, or the at least one on-board vehicle signaling system, or both the at least one trackside signaling system and the at least one on-board vehicle signaling system, information regarding respective factors affecting braking of the railway vehicle that includes information regarding a corrective factor to be applied to a predefined nominal deceleration value of the at least one railway vehicle in low-adhesion conditions, $k_{wet}$. Information regarding respective factors affecting the braking of the railway vehicle is determined in real time by said braking system. An additional braking system is described wherein the information regarding respective factors affecting braking of the railway vehicle includes information regarding the (Continued)

available adhesion of at least one wheel of the railway vehicle and rail. A signaling architecture is also described.

20 Claims, 6 Drawing Sheets

(58) Field of Classification Search
CPC ............ B60Y 2200/31; B60Y 2400/81; B60T 17/228; B60T 8/1705; B60T 8/1893; B61C 15/00; B61C 15/02; B61C 15/04; B61C 15/045; B61C 15/06; B61C 15/08; B61C 15/085; B61C 15/10; B61C 15/102; B61C 15/105; B61C 15/107; B61C 15/12; B61C 15/14
USPC ............................................................ 246/62
See application file for complete search history.

(56) References Cited

FOREIGN PATENT DOCUMENTS

| | | | | |
|---|---|---|---|---|
| KR | 102088409 B1 | | 3/2020 | |
| WO | 2005095175 A1 | | 10/2005 | |
| WO | WO-2019049055 A1 | * | 3/2019 | ............ B60T 8/3235 |
| WO | 2020118373 A1 | | 6/2020 | |

* cited by examiner

BRAKING SYSTEM FOR AT LEAST ONE RAILWAY VEHICLE AND RAILWAY SIGNALING ARCHITECTURE

TECHNICAL FIELD

This invention is generally in the field of management, control, and protection systems for railway traffic and related on-board vehicle signaling, ERTMS/ETCS (European Rail Traffic Management System/European Train Control System); in particular, the invention relates to a braking system for at least one railway vehicle and a railway signaling architecture.

PRIOR ART

The performance of a railway vehicle during its operation is related to the railway infrastructure over which it is traveling and the performance of said railway vehicle.

The railway vehicle and the railway infrastructure are connected by a signaling system, which allows control and management of the railway vehicle, ensuring safe operation.

These days there are many types of railway vehicles with different features and the same may be said of signaling systems.

Most new railway transit vehicles are called gamma trains and have a fixed composition, a specified number of railway vehicles, and a known set of braking devices.

The signaling system is the bridge between the railway vehicle and the railway infrastructure and is part of both.

Known signaling systems typically comprise at least one trackside signaling system, TS, and at least one on-board vehicle signaling system, OB.

The on-board vehicle signaling system, OB, is comprised in the railway vehicle. The on-board vehicle signaling system, OB, communicates with the backbone of the at least one railway vehicle, receiving and sending information to various railway vehicle subsystems, and also communicates with the trackside signaling system, TS.

The trackside signaling system, TS, is comprised in the railway infrastructure and communicates with an infrastructure network and the on-board vehicle signaling system, OB.

The relationship between the speed of the at least one railway vehicle and the distance traveled by the at least one railway vehicle during braking is called the braking curve.

Current and past signaling systems are mainly based on the fixed block concept, where the parameters for determining the braking curve are based on predefined parameters determined during the construction of the at least one railway vehicle or train.

Said trackside signaling systems, TS, and on-board vehicle signaling systems. OB, are arranged to determine said braking curve. From the braking curve they may then determine the stopping distance of said railway vehicle.

As explained above, this braking curve is determined for each railway vehicle as a function of predetermined parameters, the value of which is predefined at the time the railway vehicle is made.

As for the case of unfavorable environmental conditions, a correction factor is usually used for cases of low adhesion coefficient. In the railway industry, this correction factor is commonly referred to as $K_{wet}$.

In the prior art, said corrective factor $K_{wet}$ is assigned a predetermined value so as to ensure that, even under adverse environmental conditions, the determined stopping distance is sufficient to ensure that safety is maintained. Consequently, the value of this corrective factor $K_{wet}$ is usually defined considering that there is a low-adhesion condition.

As explained above, signaling systems are mainly based on the fixed block concept, where the parameters for determining the braking curve are based on predefined parameters determined during the construction of at least one railway vehicle or train. Therefore, also the value of this correction factor $K_{wet}$ is only defined during the construction of the at least one railway vehicle or train.

As a result, during the normal operating condition of the railway vehicle, even when the railway vehicle is not in favorable environmental conditions, the braking curve determined by the at least one trackside signaling system. TS, and the at least one on-board vehicle signaling system, OB, will be a non-real degraded braking curve, which would account for the presence of said alleged unfavorable environmental conditions, which are not actually present.

As a result, the trackside signaling system, TS, and the at least one on-board vehicle signaling system, OB, would assign a greater stopping distance to said railway vehicle than the railway vehicle could actually achieve under more favorable environmental conditions.

On the other hand, with regard to the case wherein there is at least one fault at the level of the railway vehicle, in addition to the correction factor $K_{wet}$, for the determination of the braking curve by the at least one trackside signaling system, TS, and the at least one on-board vehicle signaling system, OB, further predetermined parameters may also be used, the value of which is again predefined at the time the railway vehicle is made.

In such a case, the braking curve determined by the at least one trackside signaling system, TS, and the at least one on-board vehicle signaling system, OB, will be a further degraded braking curve, which would also take into account the possible presence of said at least one fault.

As a result, even when the railway vehicle has no fault, the braking curve determined by the at least one trackside signaling system, TS, and the at least one on-board vehicle signaling system, OB, will be a non-real degraded braking curve that takes into account the presence of said presumed fault.

In this case, the trackside signaling system, TS, and the at least one on-board vehicle signaling system. OB, would therefore assign a greater stopping distance to said railway vehicle than the railway vehicle could actually achieve in the absence of faults or favorable environmental conditions.

FIG. 1 shows at the top the stopping distance D1 determined by the trackside signaling system, TS, and the at least one on-board vehicle signaling system, OB, in the light of said predetermined parameters, and at the bottom the actual stopping distance D2 of the railway vehicle RV in the absence of faults.

The determination of a degraded braking curve and the consequent allocation of a longer stopping distance to said railway vehicle result in a disadvantageous handling of e.g., traffic on the rail line. In effect, the railway vehicles will be made to travel greater distances from each other than are necessary.

A possible example of a braking curve calculation is provided generically below. The calculation of the braking curve is for example described in the ETCS specification (ERTMS/ETCS, Subset 026-3, Subset 026-7).

A braking curve is usually generated by the braking calculation performed by the on-board vehicle signaling system OB. The calculation of the braking curve is based in part on said correction factor $K_{wet}$ in case of a low adhesion coefficient. This correction factor usually depends on the speed $K_{wet}(V)$ and said vehicle.

Some examples of parameters that may impact the calculation of the braking curve are for example:

- safe deceleration, relevant to safety: A_SAFE (V, d): Depends on speed and distance, dependent on the railway vehicle;
- safe deceleration of the emergency brake: A_BRAKE_SAFE (V, d): Depends on the speed and distance, depends on the vehicle;
- emergency brake deceleration: A_BRAKE_EMERGENCY (V, d): Depends on the speed and distance, depends on the vehicle;
- coefficients of the confidence levels: M_NVEBCL: National value, dependent on the railway line;
- vehicle braking performance: $K_{dry}$(V, M_NVEBCL): Depends on the speed and confidence level, depends on the vehicle;
- weighing factor for available wheel/rail adhesion: M_NVAVADH: National value, dependent on the rail line;
- adhesion factor: M_ADHESION: Coefficient on the rail, dependent on the rail;
- condition type of the rail: M_TRACKCOND: may disable certain types of brakes, depending on the rail;
- special brakes (EP, MTB, Eddy current, ED): Used to affect brake build-up and deceleration time, depending on the railway vehicle;
- maximum deceleration under reduced adhesion conditions (mu<0.06): A_MAXREDADH: According to the location of the brake and special brakes, national value.

In the prior art, the emergency brake deceleration and the coefficients $K_{dry}$ and $K_{wet}$ that affect the overall braking distance calculation and the overall performance of the railway vehicle are measured during commissioning or calculated offline using Monte Carlo simulations.

The formula that may be used is $$A_{safe}(v, d) = A_{Brake_{safe}}(v, d) + A_{gradient}(d) \quad (1)$$

The safe deceleration $A_{safe}$ is based on the safe deceleration of the emergency brake $A_{brakesafe}$ and on the deceleration of the gradient $A_{gradient}$ for locations with normal adhesion conditions.

$$A_{safe}(v, d) = \mathrm{MIN}\left(A_{Brake_{safe}}(v, d), A_{MAXREDADH}\right) + A_{gradient}(d) \quad (2)$$

The safe deceleration $A_{safe}$ is based on the minimum value between the safe emergency brake deceleration $A_{brakesafe}$ and the maximum deceleration in reduced adhesion conditions $A_{MAXREDADH}$ and deceleration of the gradient $A_{gradient}$ for positions with reduced adhesion conditions.

$$A_{Brake_{safe}}(v, d) = A_{brake\,emergency}(v, d) \times K_{dry_{rst}}(v, \mathrm{M\_NVEBCL}) \times [K_{wet_{rst}}(v) + \mathrm{M\_NVAVADH} \times (1 - K_{wet\_rst})] \quad (3)$$

$A_{BRAKEsafe}$ is the deceleration that the railway vehicle is able to achieve as a function of speed and distance. The equation shows that it depends on $A_{brake\ emergency}$ as a function of speed and distance. The values depend on the special type of brake that may be used during braking.

The special type of braking device that may be used is obviously determined by the presence or absence of that special braking device, but also by the value of $M_{TRACKCOND}$. In effect, this variable represents the inhibition of some type of special braking device on a portion of the track.

The equation also depends on $K_{dry}$ as a function of speed and confidence level. The confidence level is the target for the reliability of the $K_{dry}$ coefficient. It is used to account for the fault rate of a piece of equipment and the distribution around the expected value.

The equation also depends on $K_{wet}$ as a function of the speed. The $K_{wet}$ coefficient is based on field tests according to EN15595 during which the performance of the WSP ("Wheel Slip Protection") system is evaluated and the extension of the braking distance is monitored. The extent of the braking distance is then converted to the $K_{wet}$ coefficient.

The equation also depends on $M_{NVAVADH}$ and this value is used to allow modulation of the $K_{wet}$ coefficient by the operator.

The formulas above are just an example of the various possible formulas for calculating the overall braking distance.

The following are some exemplifying cases:

Case 1:

The following data provides an example of the use of the different variables and their impact (based on actual field data):

- $M_{NVAVADH}$=0| $K_{wet}$ is fully considered in the formula (3) above;
- $K_{wet}$=0.7|$K_{wet}$ is determined according to EN15595;
- $M_{ADHESION}$=1|The rail is not slippery;
- $K_{dry}$=0.8|$K_{dry}$ calculated based on the EBCL level, considers 1 fault;
- $A_{MAXREDADH}$=0.5|Not relevant in this situation since the rail is not slippery:

With the variables set as described above, the system is resilient at the first fault because the fault was considered by calculating the $K_{dry}$ for the nominal operating condition. This consideration also degrades the performance achievable under real nominal conditions (no fault).

With the variables set as described above, the system should run at a slower speed from the second fault, thus affecting operational service.

With the variables set as above, under normal dry running conditions, the braking distance always considers the degradation of the braking distance based on the low-adhesion conditions defined in EN15595.

Case 2:

Considering now this second dataset:

- $M_{NVAVADH}$=0|$K_{wet}$ is fully considered in the formula (3) above;
- $K_{wet}$=0.7|$K_{wet}$ is determined according to EN15595;
- $M_{ADHESION}$=0|the rail is slippery;
- $K_{dry}$=0.8|$K_{dry}$ calculated based on the EBCL level, considers 1 fault;
- $A_{MAXREDADH}$=0.3|relevant in this situation since the rail is slippery:

With the variables set as described above, the rail is slippery and the minimum value between the safe emergency brake deceleration and $A_{MAXREDADH}$ is used to determine the safe deceleration.

Considering that A_MAXREDADH is the minimum, $K_{dry}$ and $K_{wet}$ are no longer used, and the deceleration used does not depend on either actual adhesion or equipment fault.

SUMMARY OF INVENTION

One object of this invention is to provide a solution for informing a trackside signaling system, TS, and/or an on-board vehicle signaling system, OB, on the actual performance achievable by the vehicle during braking, in real time, depending on the actual adhesion condition of the line on which the at least one railway vehicle is traveling.

In this way, the trackside signaling system, TS, and/or the on-board vehicle signaling system, OB, will be able to use the received information regarding the adhesion condition to determine the performance achievable by the railway vehicle and adjust the calculation of the braking curves, and consequently the stopping distance, as a function of the actual working conditions of the railway vehicle.

For example, under dry conditions, the trackside signaling system. TS, and/or the on-board vehicle signaling system, OB, will be able to determine a true braking distance that will allow for a shorter braking distance than in the prior art so that vehicles may travel closer together, increasing overall line capacity.

Conversely, in low-adhesion conditions, the trackside signaling system, TS, and/or the on-board vehicle signaling system, OB, will result in a greater braking distance than the previous case to ensure safe stopping distances. In this case, the braking distance may be determined by taking into account the actual adhesion condition and the relative correction factor $K_{wet}$ to be applied when calculating the braking curve.

The new signaling system is oriented toward movable blocks and automatic train operation (ATO).

Movable blocks allow the vehicle's movement to be modulated according to their features and the actual presence of other railway vehicles. This type of signaling system may take into account the features of each vehicle.

The aforesaid and other objects and advantages are achieved, according to one aspect of the invention, by a braking system for at least one railway vehicle having the features defined in claim 1 and by railway signaling architecture having the features defined in claim 14. Preferred embodiments of the invention are defined in the dependent claims, the content of which is to be understood as an integral part of this description.

BRIEF DESCRIPTION OF THE DRAWINGS

The functional and structural features of some preferred embodiments of a braking system for a vehicle for at least one railway vehicle and a railway signaling architecture according to the invention will now be described. Reference is made to the appended drawings, wherein.

DETAILED DESCRIPTION

Figure 1:
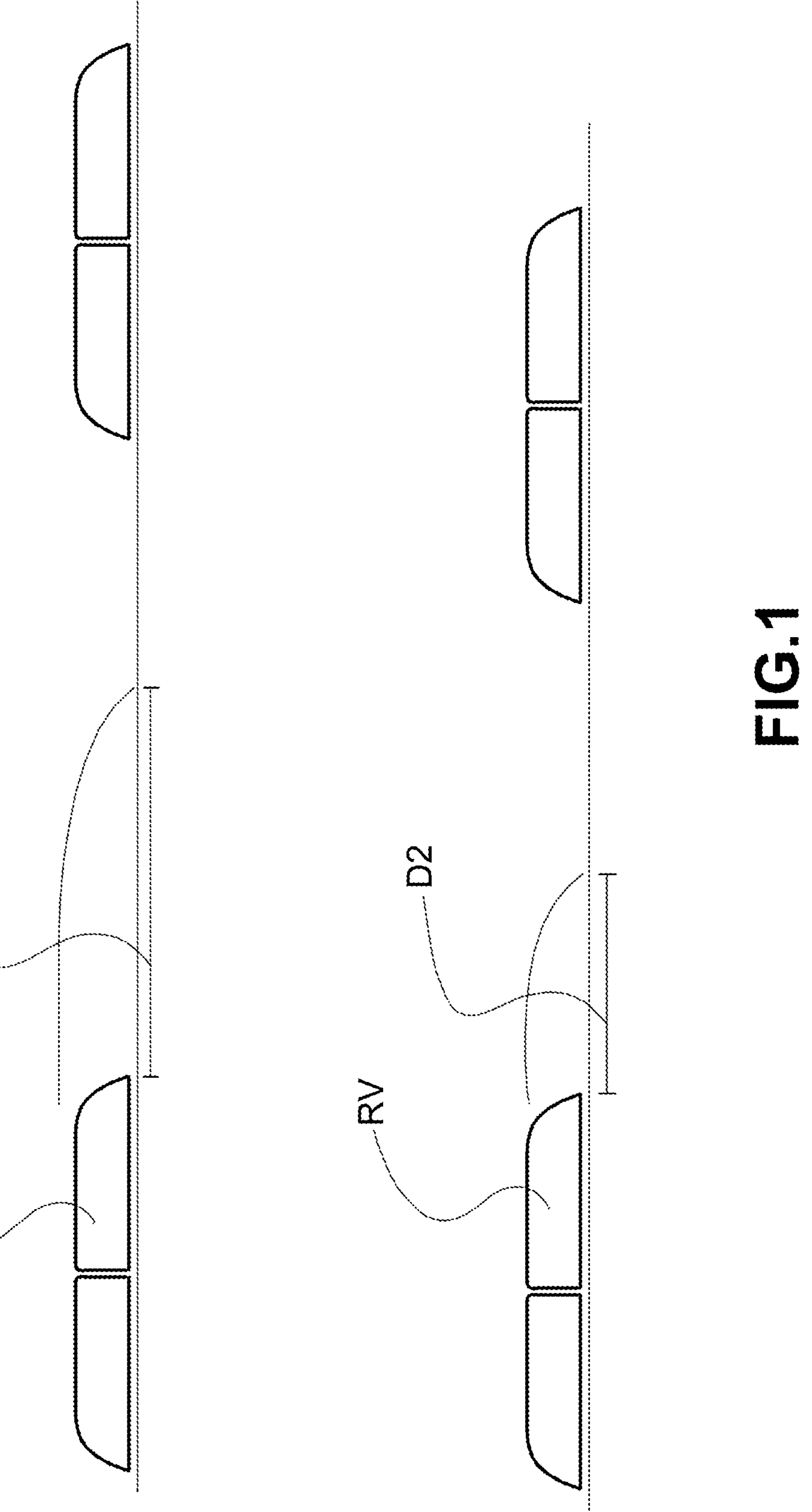
FIG. 1 illustrates by way of example two possible braking curves.

Before describing a plurality of embodiments of the invention in detail, it should be clarified that the invention is not limited in its application to the construction details and configuration of the components presented in the following description or illustrated in the drawings. The invention may assume other embodiments and be implemented or constructed in practice in different ways. It should also be understood that the phraseology and terminology have a descriptive purpose and should not be construed as limiting. The use of "include" and "comprise" and their variations is to be understood as encompassing the elements set out below and their equivalents, as well as additional elements and the equivalents thereof.

In the following, a first embodiment of a braking system for at least one railway vehicle according to the invention is described.

In this first embodiment, the braking system is arranged to provide information regarding respective factors affecting braking of the railway vehicle to at least one trackside signaling system, TS, or to at least one on-board vehicle signaling system, OB, or to both at least one trackside signaling system, TS, and at least one on-board vehicle signaling system, OB. Such information regarding respective factors affecting the railway vehicle braking includes information regarding a correction factor to be applied to a predefined value of nominal deceleration of the at least one railway vehicle in low-adhesion conditions, $k_{wet}$.

This information regarding respective factors affecting railway vehicle braking is determined in real time by the braking system. In particular, such information regarding factors affecting railway vehicle braking is not static and is not default values defined during the construction of the railway vehicle.

For example, the braking system may determine in real time the corrective factor to be applied to a predefined nominal deceleration value of the at least one railway vehicle in low-adhesion conditions, $k_{wet}$, from, for example, an adhesion value associated with an axle of said railway vehicle. For example, it may be the same braking system that determines the corrective factor $k_{wet}$ by measuring the adhesion value of said one axle or by reading or receiving the adhesion value of said one axle from a special system/means/device associated with said braking system (e.g., a "wheel slide protection" system. WSP).

In a second embodiment, the braking system 100 is again arranged to provide information regarding respective factors affecting braking of the railway vehicle to at least one trackside signaling system TS, or to at least one on-board vehicle signaling system OB, or to both at least one trackside signaling system TS and at least one on-board vehicle signaling system OB.

In contrast to the preceding embodiment, in this second embodiment, the information regarding respective factors affecting braking of the railway vehicle includes information regarding the available adhesion of at least one wheel W of the railway vehicle and rail R.

The information regarding respective factors affecting the braking of the railway vehicle is again determined in real time by the braking system.

In this embodiment, the at least one trackside signaling system TS is arranged to determine the corrective factor to be applied to a predefined value of nominal deceleration of the at least one railway vehicle in low-adhesion conditions, $k_{wet}$, depending on said information regarding the available adhesion of the at least one wheel W of the railway vehicle and rail R received. Additionally or alternatively, the at least one on-board vehicle signaling system OB is arranged to determine a correction factor to be applied to a predefined nominal deceleration value of the at least one railway vehicle in low-adhesion conditions, $k_{wet}$, depending on said information regarding the available adhesion of at least one wheel W of the railway vehicle and rail R received.

Figure 2:
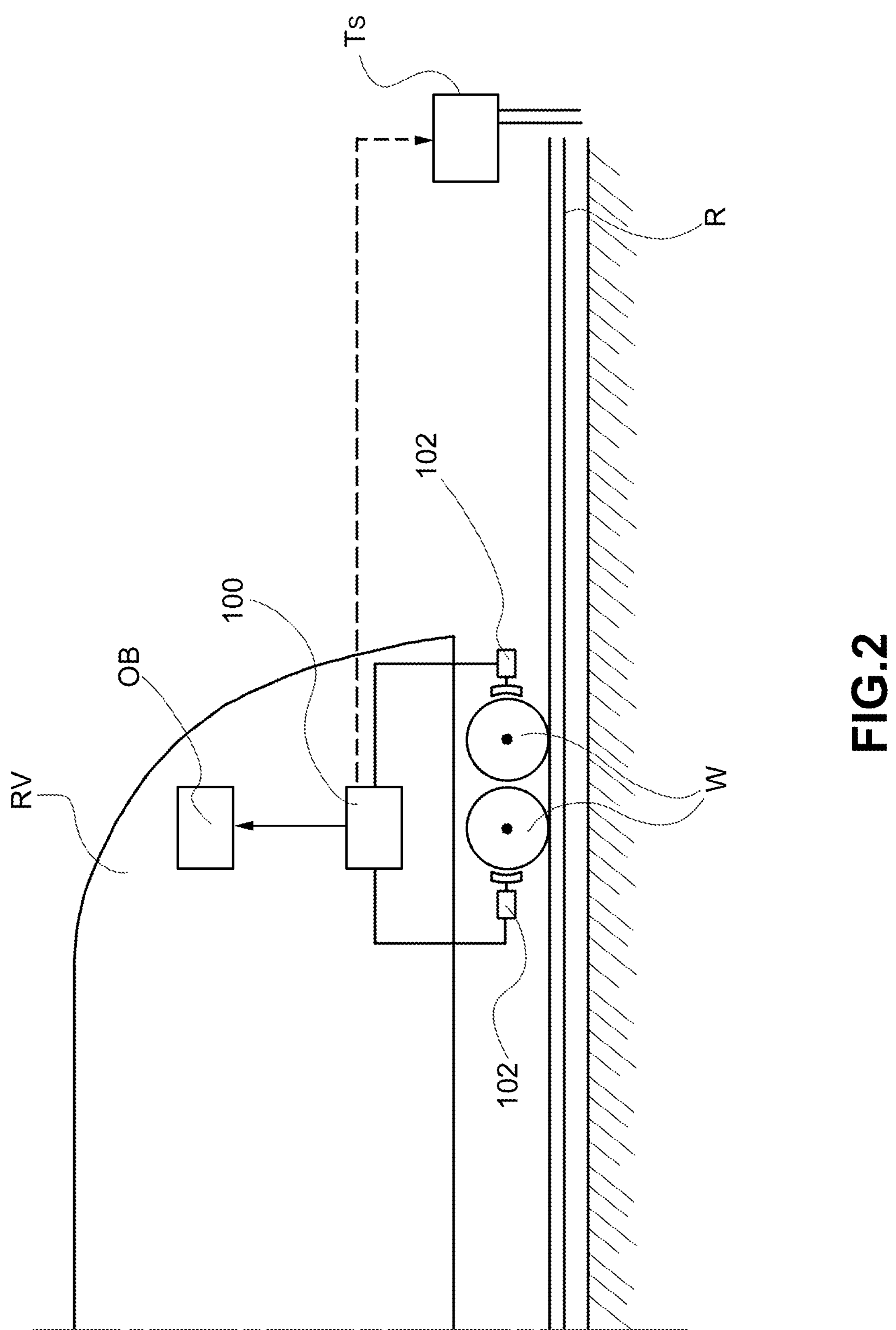
FIG. 2 illustrates an embodiment of the invention.

Preferably, as for example observable in FIG. 2, a braking system for at least one railway vehicle may include at least one braking device 102.

Preferably, for any of the preceding described embodiments, the information regarding respective factors affecting braking of the railway vehicle may further include at least one of:

- information regarding an optimal sliding point between wheel and rail, determined by the braking system 100;
- information regarding a speed of at least one railway vehicle;
- information regarding a braking distance determined by the braking system (100) based on the current speed of the at least one railway vehicle;
- information regarding the availability for use of said at least one braking device 102;
- information regarding a deceleration of the railway vehicle;
- information regarding a level of braking force applied by at least one braking device.

The term "providing" to at least one trackside signaling system. TS, or to at least one on-board vehicle signaling system, OB, or to both the at least one trackside signaling system, TS, in this invention, means both where there is a direct provision and where there is an indirect provision obtained through an intermediate provision to one or more intermediate means elements/devices or systems, e.g., an intermediate train control and management system, TCMS ("TRAIN CONTROL & MANAGEMENT SYSTEM") TCMS that receives information from the braking system and transmits it to the at least one trackside signaling system, TS, or the at least one on-board vehicle signaling system, OB, or to both the at least one trackside signaling system, TS, and the at least one on-board vehicle signaling system, OB.

Factors affecting the railway vehicle braking may be understood to mean all those aspects internal to the railway vehicle or environmental aspects external to the railway vehicle that may impact the braking action of the railway vehicle.

Information regarding the available adhesion of at least one wheel of the railway vehicle and rail may be understood as information indicative of the currently available adhesion of at least one wheel of the railway vehicle and rail, for example detected or determined in real time according to known algorithms.

Information regarding an optimal sliding point between wheel and rail, determined by the braking system, may be understood as information indicative of an optimal sliding point between wheel and rail, for example detected or determined in real time according to known algorithms. Modern WSPs use the axle sliding point to improve braking performance in low-adhesion conditions. This sliding point may be determined in several ways. Many of them require trial and error to determine the optimal sliding point. This generates a loss of braking force compared to having the optimal sliding point already available. The optimum sliding point is valuable information for the braking system because it may affect the overall deceleration/braking distance of the vehicle.

Using a principle similar to that described for adhesion information, the optimal sliding point may be shared between related braking devices and related signaling devices and then sent back to a subsequent railway vehicle or train.

Information regarding a correction factor to be applied to a predefined value of nominal deceleration of at least one railway vehicle in low-adhesion conditions, $k_{wet}$, may be understood as information indicative of a correction factor value in the case of a low adhesion coefficient.

Information regarding a railway vehicle speed may be understood as information indicative of a current railway vehicle speed detected or determined in real time.

Information regarding a braking distance determined by the braking system from the current speed of the vehicle may be understood as information indicative of the braking distance determined by the braking system, according to any known algorithm.

Information regarding the current availability for use of said at least one braking device may be understood to mean, for example, information regarding whether a certain braking device is usable or not, for example due to a fault.

Information regarding a current deceleration of the railway vehicle may be understood as information indicating the deceleration of the railway vehicle in real time.

Information regarding a current braking force level may be understood as information indicative of the current level of braking applied by the braking devices. This information is, for example, the percentage of application with respect to a maximum possible braking level. This information may also be sent for monitoring purposes.

This information may be used to adapt the braking distance calculation based on the actual force transferred rather than the expected force to be transferred. This would make the braking distance calculation more accurate.

Preferably, the at least one braking device is of the electropneumatic or electrodynamic or electromechanical type.

Figure 2B:
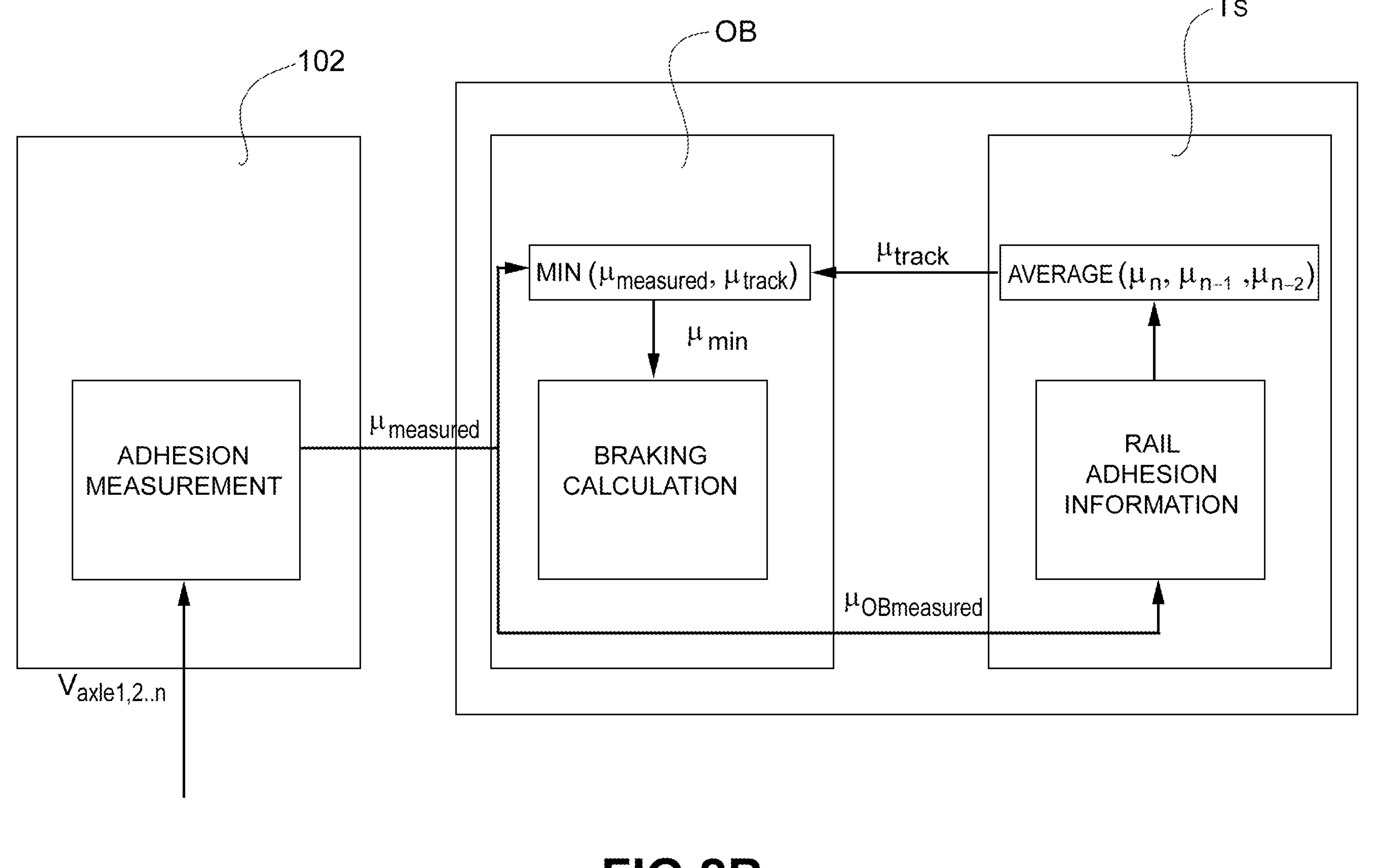
FIG. 2B illustrates a block diagram of an example of using adhesion information.

The following is an example of using adhesion information. In this case, it is considered that the at least one braking device may measure the adhesion present between the wheel and rail. A common method for measuring adhesion is described in EN15595. The measured adhesion value may then be communicated by the braking system. As may be observed in FIG. 2B, the braking distance calculation uses as input an adhesion value Amin based on the lowest value between the measured adhesion $\mu_{measured}$ and the rail adhesion $\mu_{track}$ to determine the braking distance, MIN($\mu_{measured}$, $\mu_{track}$).

$V_{axle1,2\ldots n}$ is the speed of the respective axles used to determine the measured adhesion $\mu_{measured}$.

The trackside signaling system TS communicates a rail adhesion value $\mu_{track}$ to the passing railway vehicle.

When the first railway vehicle brakes, the measured adhesion $\mu_{measured}$ is communicated to the on-board vehicle signaling system OB. At the end of each braking sequence (end of braking or with railway vehicle speed is equal to 0 $V_{RV}$=0) the measured adhesion of the on-board vehicle signaling system $\mu_{OBmeasured}$ is communicated to the trackside signaling system TS. The trackside signaling system TS stores the rail information received $\mu_{OBmeasured}$. The on-board vehicle signaling system OB of a subsequent railway vehicle may receive a μtrack rail adhesion value $\mu_{track}$ updated based on said $\mu_{OBmeasured}$.

$\mu_{track}$ is the average adhesion measured over at least the last 3 stored adhesion values, AVERAGE ($\mu$, $\mu_{n-1}$, $\mu_{n-2}$).

$\mu_{min}$ or $\mu_{measured}$ may be used in the braking distance calculation by modulating the factor, e.g., $K_{wet}$, used in ETCS, determining the impact of braking distance extension due to low adhesion.

In this case $$K_{wet} = \frac{\mu_{measured}}{\mu_{dry}},$$

with $K_{wet}$ as the coefficient representing the available adhesion.

This would allow the braking curves to be modulated based on the actual measured adhesion values and to have a conservative approach since the coefficient thus defined would estimate a longer braking distance than the actual vehicle performance due to the rail cleaning effect.

This method allows for the rail adhesion data to be continuously updated and for a braking distance calculation based on the actual state of rail adhesion to be used, as described above in reference to the second embodiment. Another alternative approach would be to transmit the $K_{wet}$ coefficient instead of the measured adhesion, as described above in reference to the first embodiment.

The following is an example of using information regarding the availability of the braking device.

Currently, railway vehicle suppliers calculate a fault rate for each and every piece of braking equipment, i.e., each type of braking device and the other elements involved in initiating, propagating, and applying emergency braking.

In the current ETCS braking distance calculation, a confidence level variable is used to determine the validity of emergency braking deceleration, taking into account the possible unavailability of the braking devices and the probabilistic distribution of their force. Typically, an offline Monte Carlo approach is used for the faults of different devices.

Disadvantageously, this approach is static and does not consider actual faults but does take into account the broader probability of faults.

Due to this invention, the signaling, given the appropriate information, may comprise in real time the availability of all braking devices on board the vehicle. With this information exactly how much braking distance is achievable may be calculated.

For example, the railway vehicle has only electropneumatic brakes EP, no other components are part of the initiation, propagation, or application of emergency braking. Consider, for example, that 10 devices are used nominally. Each device corresponds to 10% of the entire braking force. The fault rate of the single EP braking device is $5\times10^{-6}$ per hour.

Example 1

The vehicle is running and has no EP device faults. The probabilistic distribution of the EP brake is equal to one dirac. The vehicle will achieve 100% deceleration with a certainty of at least $1\times10^{-5}$ equivalent to EBCL level 5. In other words, the vehicle will reach deceleration with less certainty than the fault rate of 1 fault of the EP device. The vehicle will achieve 90% deceleration with a certainty of at least $1\times10^{-10}$, which is higher than EBCL level 9. In other words, the vehicle will reach deceleration with less certainty than the fault rate of 2 faults of the EP device. However, since the certainty is higher than the fault rate of 1 EP device, we consider that 1 EP device will fail.

Example 2

The vehicle is running and has 1 EP device fault. This has been notified to the on-board vehicle signaling, meaning that the deceleration degraded with 1 EP device fault is 90% of the nominal deceleration. The vehicle will achieve 90% deceleration with a certainty of at least $1\times10^{-5}$ equivalent to EBCL level 5. The vehicle will achieve degraded deceleration with less certainty than the fault rate of 1 fault of the EP device. It achieves degraded deceleration and not the nominal deceleration because 1 EP unit has already failed. The vehicle will achieve 80% deceleration with a certainty of at least $1\times10^{-10}$ above EBCL level 9. The vehicle will reach deceleration with less certainty with respect to the fault of 2 faults of the EP device.

The following steps show how to calculate the deceleration based on the required EBCL and based on the fault rates of the considered device.

$$\alpha = nbr_{EP}$$

$$nbr_{EP} \text{ For } n = 1{:}1{:}$$

$$\text{If } \left(\lambda_{EP}^{n} < 1 \times 10^{-EBCL} \;\&\; \alpha = nbr_{EP}\right)$$

$$\alpha = n - 1$$

$$\text{End}$$

$$\text{End}$$

$$a_{achievable}(EBCL) = a_{nom} \times \left(1 - \frac{nbr_{EP\,fail} + \alpha}{nbr_{EP}}\right)$$

This example was provided for a vehicle using only EP electropneumatic brakes. The same concept may be applied to a vehicle with multiple types of braking devices if they all contribute to deceleration. The above may be applied similarly to special braking devices.

In a further aspect, referring to the current deceleration and speed of the vehicle, these may be provided by the braking devices to the related signaling devices TS, OB. The multitude of measurements may then be analyzed, and a more accurate railway vehicle speed and deceleration are made available.

Generally, the on-board vehicle signaling system OB bases the calculation of the reference speed on a limited number of speed sensors, typically between 1 and 2.

Electropneumatic EP, electrodynamic ED, electromechanical EM braking devices usually include a WSP function, which adjusts the force exerted on the wheel based on the sliding defined as the difference in longitudinal speed between the wheels and the vehicle. To adjust the force, the device in which the WSP function is embedded measures the speed of the wheel and estimates the vehicle speed according to processed algorithms.

Locally, each device bases the estimation of the speed of at least one railway vehicle on the speed of four different wheels and may also use an accelerometer or GPS to calculate the speed of the railway vehicle with at least as much accuracy as required by EN15595.

Based on the number of wheels considered and compliance with the EN standard, the estimation of the vehicle speed by the brake devices will be better than that calculated by the on-board vehicle signaling system OB.

In addition, the calculation of the speed of different units could be concentrated to have a more accurate estimate of the speed of the at least one railway vehicle.

In a further aspect, obviously the braking system 100 may also control multiple braking devices 102, associated with, for example, respective wheels of an axle or various axles.

Preferably, the braking system may also comprise at least one special braking device ("special brake"). In this case, the information regarding factors affecting the braking of the railway vehicle may further comprise:

information regarding the current availability for use of said at least one special braking device;

information regarding a current level of braking force applied by at least one special braking device.

Information regarding the current availability for use of said at least one special braking device may be understood as, for example, information indicating whether a certain special braking device is usable or not, for example due to a fault.

Information regarding a current level of braking force applied by at least one special braking device may be understood as, for example, information indicative of the current level of braking applied by special braking devices. This information is, for example, the percentage of application with respect to a maximum possible braking level. This information may also be sent for monitoring purposes.

Preferably, the at least one special braking device may be at least one magnetic track brake, MTB, and/or sandbox and/or eddy current type brake.

For example, the sandbox belongs to the category of special brakes; although it has the peculiarity of not directly contributing to the deceleration of the vehicle, it enhances the force generated by the other braking devices, and therefore has an impact on the braking of the railway vehicle.

The sandbox efficiency information may also be sent for monitoring purposes.

Figure 3:
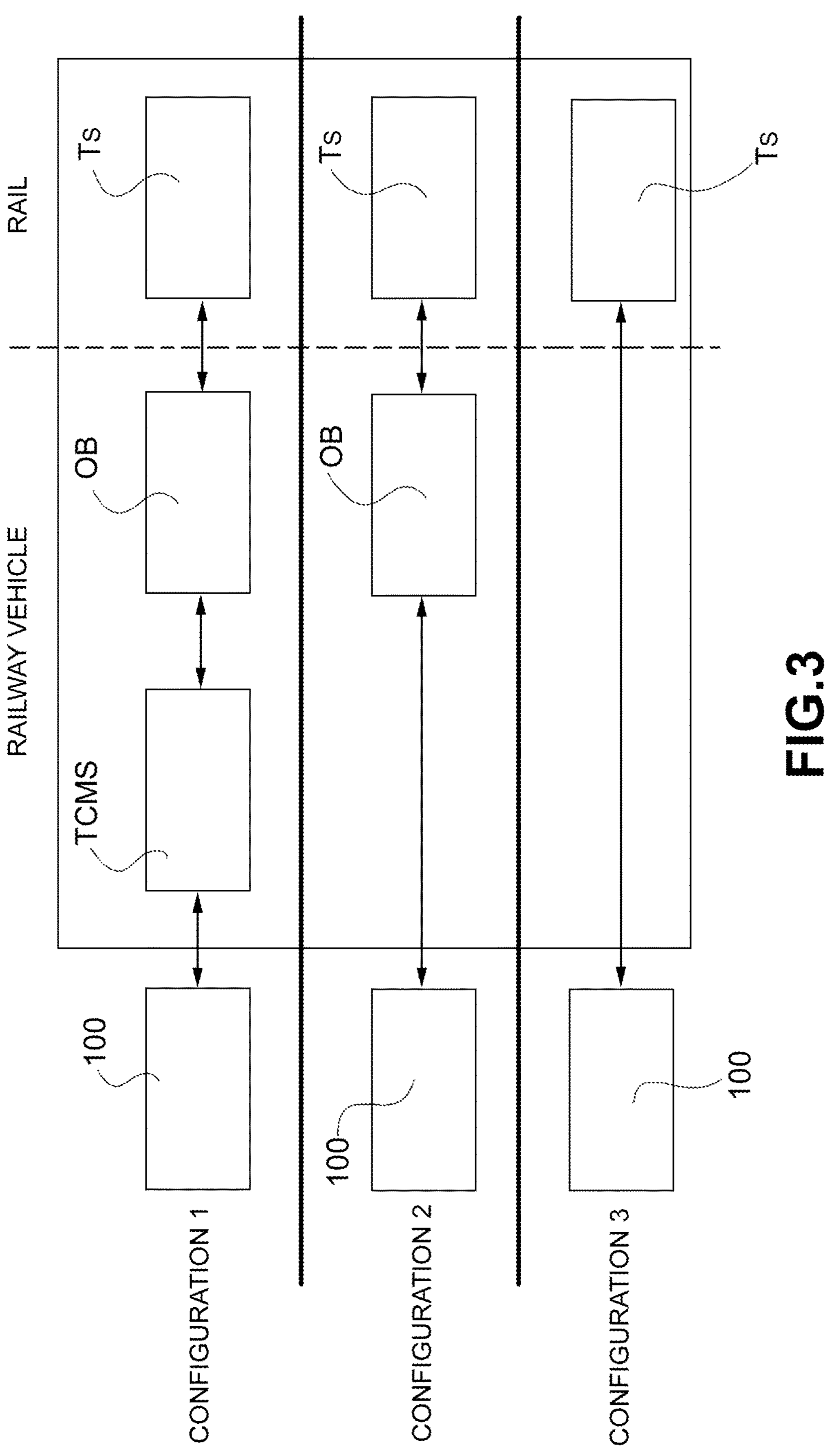
FIG. 3 illustrates three possible usage configurations.

As observable in FIG. 3, in the configuration 1 of a railway signaling architecture, the braking system may provide at least one of said information regarding factors affecting braking of the railway vehicle directly to the at least one trackside signaling system, TS.

In the configuration 2 of a railway signaling architecture, the braking system may provide at least one of said information regarding factors affecting braking of the railway vehicle to the at least one on-board vehicle signaling system, OB. In this case, said at least one on-board vehicle signaling system, OB, may be arranged to forward said information regarding factors affecting braking of the railway vehicle to the at least one trackside signaling system, TS.

In the configuration 3 of a railway signaling architecture, the braking system may be arranged to provide at least one of said information regarding factors affecting braking of the railway vehicle also by sending said information regarding factors affecting braking of the railway vehicle also to at least one train control and management system, TCMS, of said at least one railway vehicle. In such a case, said at least one on-board vehicle signaling system, OB, and/or said at least one trackside signaling system, TS, may each be arranged to receive said information concerning factors affecting braking of the railway vehicle from said train control and management system, TCMS.

In a further embodiment, when the braking system is arranged to provide at least one of said information regarding factors affecting braking of the railway vehicle to the at least one trackside signaling system, TS, the braking system may be arranged to transmit at least one of said information regarding factors affecting braking of the railway vehicle also to at least one remote server. In this case, the trackside signaling system, TS, may be arranged to receive said information regarding factors affecting braking of the railway vehicle from said at least one remote server.

Figure 4:
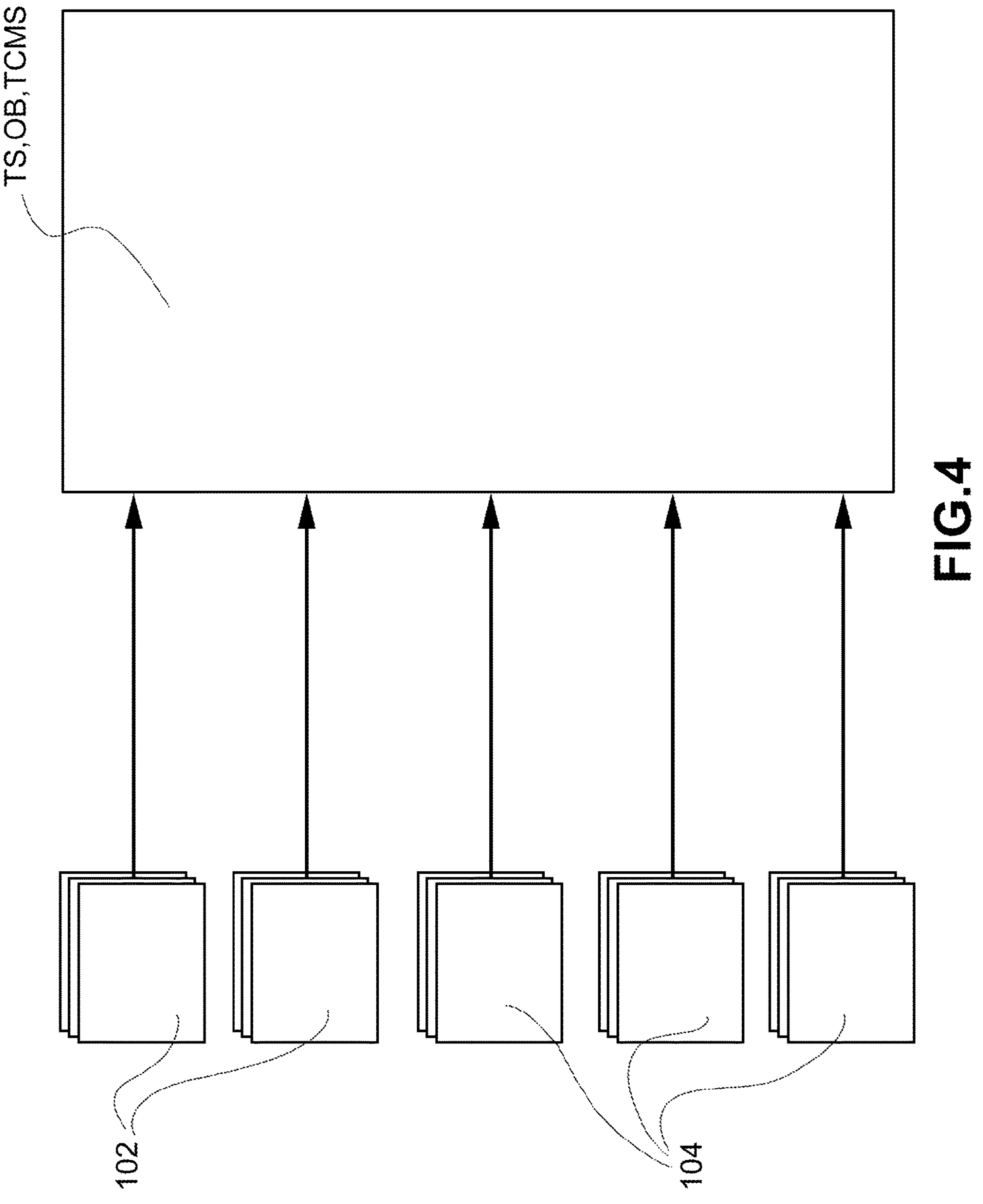
FIG. 4 illustrates an embodiment in which information regarding factors affecting the braking of the railway vehicle is transmitted in a distributed manner.

As is observable in FIG. 4, said at least one braking device may be arranged to directly provide said information regarding factors affecting braking of the railway vehicle to said at least one on-board vehicle signaling system, OB, and/or said at least one trackside signaling system, TS, or again to said at least one train control and management system, TCMS When present, said at least one special braking device 104 may also be arranged to provide said information regarding factors affecting braking of the railway vehicle to said at least one on-board vehicle signaling system, OB, and/or said at least one trackside signaling system. TS.

That is, the information is provided in a distributed manner by the one or more braking devices or one or more special braking devices.

Figure 5:
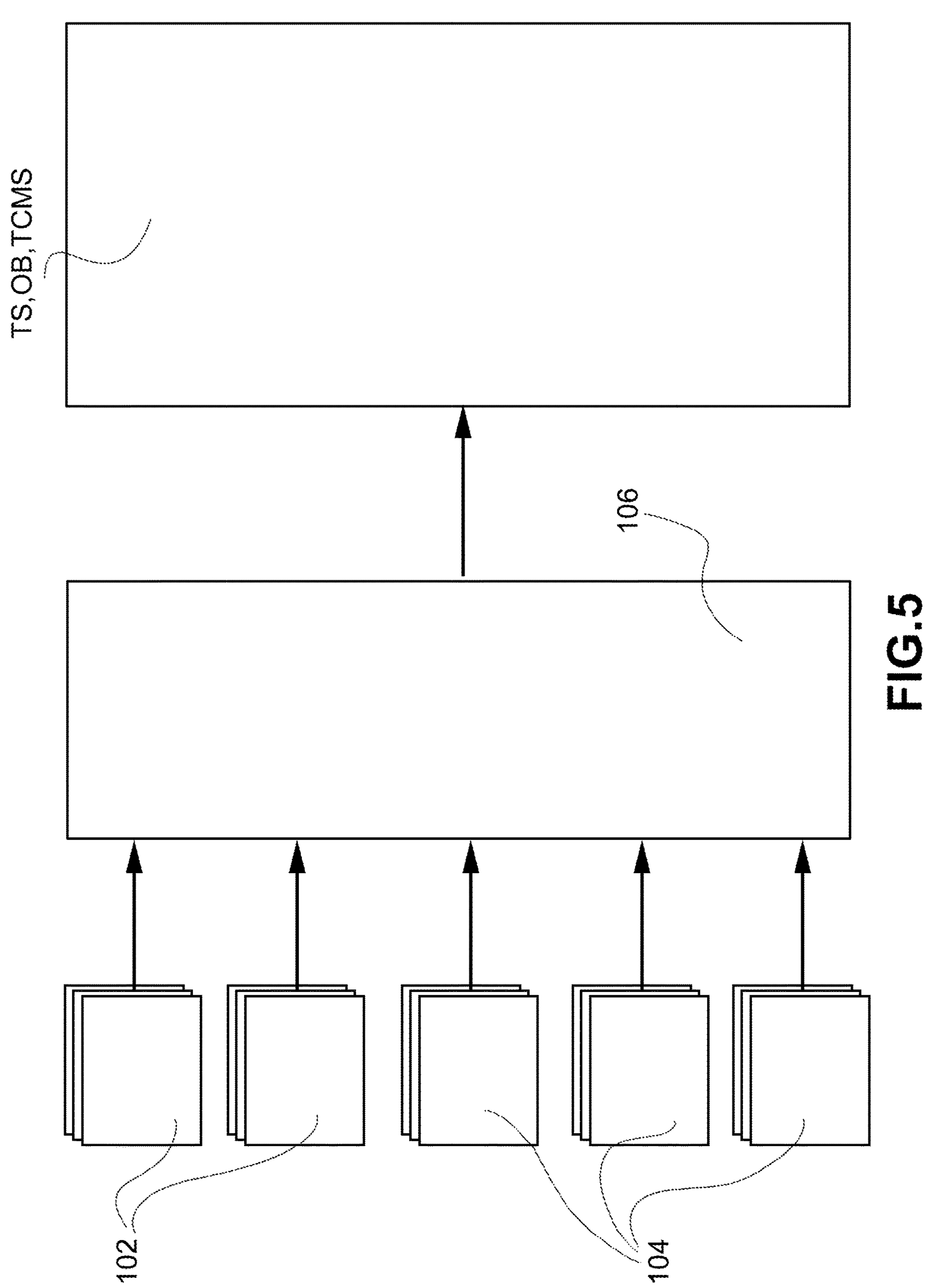
FIG. 5 illustrates an embodiment in which information regarding factors affecting the braking of the railway vehicle is transmitted centrally.

As observable in FIG. 5, in a further embodiment, the braking system may comprise at least one braking control unit 106, for example assigned to control the one or more braking devices and/or the one or more special braking devices. In this case, the braking control unit may be arranged to collect centrally from the braking devices said information regarding factors affecting braking of the railway vehicle to be provided to said at least one on-board vehicle signaling system, OB, and/or said at least one trackside signaling system, TS, or said at least one train control and management system, TCMS. When the special braking devices are present, the braking control unit may be arranged to collect also centrally from the special braking devices said information concerning factors affecting braking of the railway vehicle to be provided to said at least one on-board vehicle signaling system. OB, and/or said at least one trackside signaling system, TS.

For some types of architectures, such as the centralized one described above, it is possible to perform the braking distance calculation through the main braking device.

In effect, the real-time data needed to make an accurate estimate of braking distance is available to the unit.

Preferably, said braking control unit may process at least one of said information on factors affecting braking of the railway vehicle.

The control unit may be a solution with a Safety Integrity Level (SIL)≥2, e.g., according to the latest regulations in effect as of Aug. 27, 2020.

Preferably, the braking system provides to the at least one trackside signaling system. TS, or to the at least one on-board vehicle signaling system, OB, or to both the at least one trackside signaling system, TS, and the at least one on-board vehicle signaling system, OB, said information regarding factors affecting braking of the railway vehicle via at least one wired communication means or one wireless communication means. For example, the communication means may be a Digital I/O, Ethernet, MVB, CAN, Echelon, Bluetooth, WiFi, GSM.

The invention further relates to a railway signaling architecture, including:

a braking system according to any of the embodiments described above;

at least one trackside signaling system, TS, or at least one on-board vehicle signaling system, OB, or both at least one trackside signaling system, TS, and one on-board vehicle signaling system, OB.

In said railway signaling management architecture, when said braking system provides to the on-board vehicle signaling system, OB, said information regarding factors affecting braking of the railway vehicle, the on-board vehicle signaling system, OB, may be arranged to determine a braking curve of the railway vehicle according to said information regarding factors affecting braking of the railway vehicle.

Further, when said braking system provides said information regarding factors affecting braking of the railway vehicle to the on-board vehicle signaling system, OB, and said information regarding factors affecting braking of the railway vehicle comprise information regarding the availability of said at least one braking device, the on-board vehicle signaling system, OB, may be arranged to determine the deceleration achievable by the railway vehicle based on said information regarding the availability of said at least one braking device.

Lastly, when special braking devices are present, when said braking system provides said information regarding factors affecting braking of the railway vehicle to the on-board vehicle signaling system, OB, and said information regarding factors affecting braking of the railway vehicle comprises information regarding the availability of said at least one special braking device, the on-board vehicle signaling system, OB, may be arranged to determine the deceleration achievable by the railway vehicle based on said information regarding the availability of said at least one special braking device.

That which is explained in this description with respect to at least one railway vehicle may be similarly applied in the case of a train comprising a plurality of railway vehicles.

The advantage achieved is therefore that of having proposed a solution that allows the trackside signaling system TS and the on-board vehicle signaling system to determine the braking curve of the railway vehicle and the stopping distance of the railway vehicle as a function of real time parameters inherent to the adhesion condition surrounding it. Various aspects and embodiments of a braking system with a signaling architecture according to the invention have been described. It is understood that each embodiment may be combined with any other embodiment. Furthermore, the invention is not limited to the described embodiments, but may be varied within the scope defined by the appended claims.

The invention claimed is:

1. A braking system for at least one railway vehicle, wherein said braking system is arranged to provide to at least one trackside signaling system, or to at least one on-board vehicle signaling system, or to both at least one trackside signaling system and at least one on-board vehicle signaling system, information regarding respective factors affecting braking of the railway vehicle;

wherein said information regarding respective factors affecting the braking of the railway vehicle includes:

information regarding a correction factor to be applied to a predefined nominal deceleration value of the at least one railway vehicle in conditions of low adhesion, $k_{wet}$;

wherein said information regarding factors affecting the braking of the railway vehicle is determined in real time by said braking system; and wherein said braking system is further arranged to control the at least one railway vehicle by adjusting a braking effort applied by at least one braking device based on said information regarding respective factors affecting the braking of the railway vehicle.

2. A braking system for at least one railway vehicle, wherein said braking system is arranged to provide to at least one trackside signaling system, or to at least one on-board vehicle signaling system, or to both at least one trackside signaling system and at least one on-board vehicle signaling system, information regarding respective factors affecting the braking of the railway vehicle;

wherein said information regarding respective factors affecting the braking of the railway vehicle includes:

information regarding the available adhesion of at least one wheel of the railway vehicle and rail;

wherein said information regarding respective factors affecting the braking of the railway vehicle is determined in real time by said braking system;

wherein said at least one trackside signaling system is arranged to determine a corrective factor to be applied to a predefined nominal deceleration value of the at least one railway vehicle in low-adhesion conditions, $k_{wet}$, as a function of said information regarding the available adhesion of the at least one wheel of the railway vehicle and rail received, and/or said at least one on-board vehicle signaling system is arranged to determine a corrective factor to be applied to a predetermined nominal deceleration value of the at least one railway vehicle in low-adhesion conditions, $k_{wet}$, as a function of said information regarding the available adhesion of the at least one wheel of the railway vehicle and rail received; and wherein said braking system is further arranged to control the at least one railway vehicle by adjusting a braking effort applied by at least one braking device based at least in part on said information regarding respective factors affecting the braking of the railway vehicle.

3. The braking system according to claim 1, wherein said braking system includes the at least one braking device.

4. The braking system according to claim 3, wherein said information regarding respective factors affecting braking of the railway vehicle further includes at least one of:

information regarding an optimal sliding point between wheel and rail, determined by the braking system;

information regarding a speed of the at least one railway vehicle;

information regarding a braking distance determined by the braking system based on a current speed of the at least one railway vehicle;

information regarding an availability for use of the at least one braking device;

information regarding a deceleration of the railway vehicle;

information regarding a level of braking force applied by the at least one braking device.

5. The braking system according to claim 4, further comprising at least one additional braking device;

wherein said information regarding factors affecting braking of the railway vehicle, determined in real time by said braking system, further comprises:

information regarding the availability for use of said at least one additional braking device;

information regarding a level of braking force applied by the at least one additional braking device.

6. The braking system according to claim 5, wherein said at least one additional braking device includes at least one of the following devices:

a magnetic track brake, MTB;

a sandbox;

an Eddy current brake.

7. The braking system according to claim 5, wherein said at least one additional braking device is arranged to provide said information regarding factors affecting the braking of the railway vehicle to said at least one on-board vehicle signaling system and/or said at least one trackside signaling system.

8. The braking system according to claim 5, wherein:

when said braking system is arranged to provide to the on-board vehicle signaling system said information regarding factors affecting the braking of the railway vehicle, and said information regarding factors affecting the braking of the railway vehicle comprises information regarding the availability for use of said at least one additional braking device, the on-board vehicle signaling system is arranged to determine the deceleration that may be reached by the railway vehicle as a function of said information regarding the availability for use of said at least one additional braking device.

9. A railway signaling architecture, including:

the braking system according to claim 4;

at least one trackside signaling system, or at least one on-board vehicle signaling system, or at least one trackside signaling system and at least one on-board vehicle signaling system.

10. The railway signaling architecture, according to claim 9, wherein:

when said braking system is arranged to provide to the on-board vehicle signaling system said information regarding factors affecting the braking of the railway vehicle, the on-board vehicle signaling system is arranged to determine a braking curve of the railway vehicle as a function of said information regarding factors affecting the braking of the railway vehicle.

11. The railway signaling architecture, according to claim 9, wherein:

when said braking system is arranged to provide to the on-board vehicle signaling system said information regarding factors affecting the braking of the railway vehicle, and said information regarding factors affecting the braking of the railway vehicle comprises information regarding the availability for use of said at least one braking device, the on-board vehicle signaling system is arranged to determine the deceleration that may be reached by the railway vehicle as a function of said information regarding the availability for use of said at least one braking device.

12. The railway signaling architecture according to claim 9, wherein, when the braking system is arranged to provide at least one of said information regarding factors affecting the braking of the railway vehicle to the at least one on-board vehicle signaling system, said at least one on-board vehicle signaling system is arranged to forward said information regarding factors affecting the braking of the railway vehicle to the at least one trackside signaling system.

13. The railway signaling architecture according to claim 9, wherein said braking system is arranged to provide at least one of said information regarding factors affecting the braking of the railway vehicle by sending said information regarding factors affecting the braking of the railway vehicle to at least one train control and management system of said at least one railway vehicle;

and said at least one on-board vehicle signaling system and/or said at least one trackside signaling system is/are arranged to receive said information regarding factors affecting the braking of the railway vehicle from said train control and management system.

14. The railway signaling architecture according to claim 9, wherein, when the braking system is arranged to provide at least one of said information regarding factors affecting the braking of the railway vehicle to the at least one trackside signaling system, said braking system is arranged to transmit at least one of said information regarding factors affecting the braking of the railway vehicle to at least one remote server, and said trackside signaling system is arranged to receive said information regarding factors affecting the braking of the railway vehicle from said at least one remote server.

15. The braking system according to claim 3, wherein said at least one braking device is of an electropneumatic or electrodynamic or electromechanical type.

16. The braking system according to claim 3, wherein said at least one braking device is arranged to provide said information regarding factors affecting the braking of the railway vehicle to said at least one on-board vehicle signaling system and/or said at least one trackside signaling system.

17. The braking system according to claim 1, comprising at least one braking control unit;

the braking control unit being arranged to collect in a centralized manner from the braking devices said information regarding factors affecting the braking of the railway vehicle to be provided to said at least one on-board vehicle signaling system and/or said at least one trackside signaling system.

18. The braking system according to claim 17, wherein the braking control unit is arranged to collect in a centralized way from at least one additional braking device said information regarding factors affecting the braking of the railway vehicle to be provided to said at least one on-board vehicle signaling system and/or said at least one trackside signaling system.

19. The braking system according to claim 17, wherein said braking control unit is arranged to process at least one of said information regarding factors affecting the braking of the railway vehicle.

20. The braking system according to claim 1, wherein the braking system provides to the at least one trackside signaling system, or to the at least one on-board vehicle signaling system or to both the at least one trackside signaling system and at least one on-hoard vehicle signaling system, said information regarding factors affecting the braking of the railway vehicle through at least one hard-wired communication means or wireless communication means.

* * * * *